(12) United States Patent
Molinaro et al.

(10) Patent No.: US 12,168,427 B2
(45) Date of Patent: Dec. 17, 2024

(54) REDUCTION GEARBOX FOR DRUM BRAKE, OFFERING SIGNIFICANT CONFORMABILITY

(71) Applicant: FOUNDATION BRAKES FRANCE, Drancy (FR)

(72) Inventors: Alberto Molinaro, Noisy le Grand (FR); Cédric Guignon, La Queue en Brie (FR); Luu Gérard, Noisy le Grand (FR); Christophe Dupas, Pornic (FR)

(73) Assignee: FOUNDATION BRAKES FRANCE, Drancy (FR)

( * ) Notice: Subject to any disclaimer, the term of this patent is extended or adjusted under 35 U.S.C. 154(b) by 568 days.

(21) Appl. No.: 17/418,413

(22) PCT Filed: Dec. 18, 2019

(86) PCT No.: PCT/FR2019/053171
§ 371 (c)(1),
(2) Date: Jun. 25, 2021

(87) PCT Pub. No.: WO2020/136329
PCT Pub. Date: Jul. 2, 2020

(65) Prior Publication Data
US 2022/0063579 A1   Mar. 3, 2022

(30) Foreign Application Priority Data
Dec. 28, 2018  (FR) ...................... 1874367

(51) Int. Cl.
*B60T 13/74* (2006.01)
*B60T 1/06* (2006.01)
(Continued)

(52) U.S. Cl.
CPC ............ *B60T 13/746* (2013.01); *B60T 1/067* (2013.01); *F16D 65/22* (2013.01); *F16D 2121/24* (2013.01)

(58) Field of Classification Search
None
See application file for complete search history.

(56) References Cited

U.S. PATENT DOCUMENTS 9,163,700 B2 * 10/2015 Schneider .............. H02K 1/278
2009/0301824 A1   12/2009 Dettenberger et al.

FOREIGN PATENT DOCUMENTS

DE   102013107111 A1 *  1/2015   ............. F02M 26/52
FR        3016015 A1    7/2015
(Continued)

OTHER PUBLICATIONS

International Search Report issued in Application No. PCT/FR2019/053171, dated May 15, 2020.
(Continued)

*Primary Examiner* — Melanie Torres Williams
(74) *Attorney, Agent, or Firm* — Pearne & Gordon LLP

(57) ABSTRACT

A reduction motor for a parking brake mechanical actuator of a drum brake comprising an electric motor comprising an output shaft extending along a first axis, and a reduction gearbox comprising an output shaft extending along a second axis, in which the reduction gearbox, comprises stepped tangentially-meshing spur gears, each stepped gear comprising a gearwheel and a coaxial pinion, these being superposed on and secured to each other in terms of rotation, the stepped gears being mounted with the ability to rotate about mutually parallel axes.

12 Claims, 6 Drawing Sheets

(51) Int. Cl.
*F16D 65/22* (2006.01)
*F16D 121/24* (2012.01)

(56) References Cited

FOREIGN PATENT DOCUMENTS

| | | |
|---|---|---|
| FR | 3031151 A1 | 7/2016 |
| JP | 2009-529638 A | 8/2009 |
| KR | 20110011038 A | 2/2011 |
| WO | 2018/148245 A1 | 8/2018 |
| WO | WO-2019068784 A1 * 4/2019 ......... B60H 1/00857 |

OTHER PUBLICATIONS

Written Opinion issued in Application No. PCT/FR2019/053171, dated May 15, 2020.
Preliminary French Search Report for French application No. FR1874367 dated Oct. 1, 2019.
Japanese Office Action received in corresponding Japanese Patent Application No. 2021-536818, dated Jan. 30, 2024.

* cited by examiner

REDUCTION GEARBOX FOR DRUM BRAKE, OFFERING SIGNIFICANT CONFORMABILITY

CROSS-REFERENCE TO RELATED APPLICATIONS

This is a National Stage of PCT international application PCT/FR2019/053171, filed on Dec. 18, 2019, which claims the priority of French Patent Application No. 1874367, filed Dec. 28, 2018, both of which are incorporated herein by reference in their entirety.

FIELD OF TECHNOLOGY AND STATE OF THE ART

The present invention is concerned with the field of automobile vehicle brakes, and more specifically with a geared motor assembly for operating the shoes of a drum brake, offering a reduced overall size.

In the automobile industry, the function of the electromechanical parking brake is to bring the stationary vehicle to a standstill in order to prevent it from moving unexpectedly. It furthermore fulfils the legal requirement for a second braking system independent of the generally hydraulic, service braking system, in the vehicle and fulfils other comfort and safety functions, especially through its self-diagnostic capability.

It is known from document FR3016015 that a mechanical actuator can be installed in a drum brake in addition to the hydraulic actuator initially provided. Such a drum brake, marked by 1 in FIG. 1, comprises a backing plate 2 of revolution about axis AX equipped with a first and a second arc-shaped shoe 3 and 4 which are radially movable so that they can be pressed against the cylindrical inner face of a drum not represented.

The shoes 3 and 4 each have a web 3a, 4a made of flat sheet metal in the form of a circular ring portion which carries a brake lining 3b, 4b, and are diametrically oppositely mounted with their ends bearing on both a hydraulic wheel cylinder 6 and a mechanical actuator 7 carried by the backing plate 2. These shoes 3 and 4 are further biased towards each other by two return springs 8 and 9, and pressed against the backing plate 2 each by a spring 10, 11.

A wear take-up rod 12 extends along the wheel cylinder 6, having a first end bearing on the web 3a of the first shoe 3 and a second end bearing on the web 4a of the second shoe 4.

The wheel cylinder 6 is to be actuated upon using the drum brake 1 according to a first operating mode known as "simplex", which provides progressive braking particularly adapted for braking the vehicle in service. It comprises a hydraulic chamber closed at its ends by two pistons which move apart when the hydraulic pressure increases and pushes the associated ends of shoes 3 and 4.

The mechanical actuator 7 in turn provides parking and emergency braking by moving the associated ends of the shoes apart to provide rapid and powerful locking of the vehicle's wheels according to a so-called "duo-servo" operating mode, especially when the wheel cylinder 6 is inactive. This actuator is driven by an electric motor 22 with axis AY.

In practice, one of the difficulties associated with the use of a mechanical actuator lies in the need to convert a high rotational speed associated with a low torque of the electric motor, into a low displacement with sufficient load. To this end, document FR3016015 teaches to provide a reduction module that transmits a rotation of the motor 22, more precisely a rotation of an axis AY motor pinion driven directly by this motor, to the mechanical actuator 7. This reduction module is centred on the axis AY and comprises several steps of axis AY planetary gear trains in order to provide an effective speed reduction between its output measured at an axis AY output gear coupling to the mechanical actuator 7 and its input measured at the motor pinion. Furthermore, the motor 22 and the reduction module are housed together in a cylindrical housing.

The combination of the motor 22 and the reduction module requires the motor axis to be arranged in parallel to the axes of the planetary gear trains, and the axis of the reduction module to be arranged in parallel to the axes of the toothed wheels of the mechanical actuator 7. This results in a large overall size for the geared motor.

Yet the space available at the wheels is relatively small. Furthermore, this space varies greatly in size and shape depending on the vehicle model. It is therefore desirable to have a geared motor with a small overall size that facilitates its integration into different vehicle models.

DISCLOSURE OF THE INVENTION

It is therefore a purpose of the present invention to provide a geared motor, for example for actuating a parking brake of a drum brake, having an architecture making it adaptable to available spaces with varying shape and size.

The purpose set out above is achieved by a geared motor having an externally contacting gear train, the gear train comprising stepped gears. Each stepped gear includes a pinion and a toothed wheel, which are coaxial integrally rotatably superimposed with each other, the pinion of one stepped gear meshing with the toothed wheel of an adjacent stepped gear. The axes of the pinions and toothed wheels are parallel to each other.

By virtue of the invention, the arrangement of the stepped gears in relation to each other is relatively free. The general shape of the reduction gearbox can then be adapted to the configuration of the available space. Indeed for example, the reduction gearbox can have a relatively rectilinear shape, a curved shape or even an S shape. The structure of such a reduction gearbox thus offers some freedom in the choice of the external shape of the geared motor.

Further, the reduction gearbox can advantageously be relatively thin and flat in the direction of the axes of the pinions and toothed wheels. Thus it can be arranged in small spaces.

In one example, the axis of the electric motor is parallel to the axes of the gears and toothed wheels. In a particularly advantageous example, the motor axis intersects the axes of the stepped gears, and an angle transmission connects the motor to the reduction gearbox. The motor can then be arranged as a continuation of the gear train and the geared motor can offer an even more easily integratable shape.

In other words, a reduction module is made comprising a cascade of pinions and toothed wheels, advantageously formed by stepped gears, which can be deployed in a wide variety of shapes to adapt to the geometry of the available space.

One subject-matter of the present invention is therefore a geared motor for a mechanical parking brake actuator of a drum brake comprising an electric motor comprising an output shaft extending along a first axis, and a reduction gearbox comprising an output axis extending along a second axis, said reduction gearbox comprising tangentially meshing stepped gears, each stepped gear comprising a toothed wheel and a pinion coaxial which are coaxial integrally rotatably superimposed with each other, said stepped gears being mounted rotatably movable about axes parallel to each other.

Preferably, the reduction gearbox comprises only stepped gears.

The stepped gears are advantageously at least partly alternating so that the geared motor has a generally substantially flat shape.

The reduction gearbox can comprise a plate and the axes about which the stepped gears are rotatably movably mounted can be integral with the plate.

In one exemplary embodiment, the plate comprises at least two portions arranged in distinct parallel planes.

The geared motor advantageously comprises a housing comprising a first part forming a bottom and a second part forming a cover, the plate being arranged in the bottom of the housing.

For example, the reduction gearbox comprises between four and six stepped gears.

In one exemplary embodiment, the output shaft of the electric motor is orthogonal to the axes about which the stepped gears are rotatable.

Preferably, the geared motor has an angle transmission comprising a crown gear between the output shaft and the reduction gearbox.

The output axis of the reduction gearbox can be parallel to the axes about which the stepped gears are freely rotatably mounted.

Another subject-matter of the present invention is also a drum brake comprising a drum, a backing plate, two shoes, a mechanical actuator attached to the backing plate and a geared motor according to the invention.

Preferably, the geared motor is mounted on the backing plate so that the axes about which the stepped gears are freely rotatably mounted are parallel to the axis of the drum.

Another subject-matter of the present invention is also a method for making a geared motor according to the invention comprising:
  manufacturing the plate and the axes integral with the plate,
  installing the stepped gears around the axes,
  providing a housing comprising a bottom and a cover,
  installing the plate fitted with the stepped gears in the bottom of the housing,
  installing the cover of the housing.
Another subject-matter of the present invention is a method for making an electromechanically actuated drum brake comprising:
  manufacturing a drum brake,
  making a geared motor according to the making method according to the invention
  installing the geared motor so that the stepped gear at the output of the reduction gearbox drives a toothed wheel of the mechanical actuator via an angle transmission,
  attaching the geared motor to the backing plate of the drum brake.

BRIEF DESCRIPTION OF THE DRAWINGS

The present invention will be better understood using the following description and the appended drawings in which.

DETAILED DISCLOSURE OF PARTICULAR EMBODIMENTS

Figure 1:
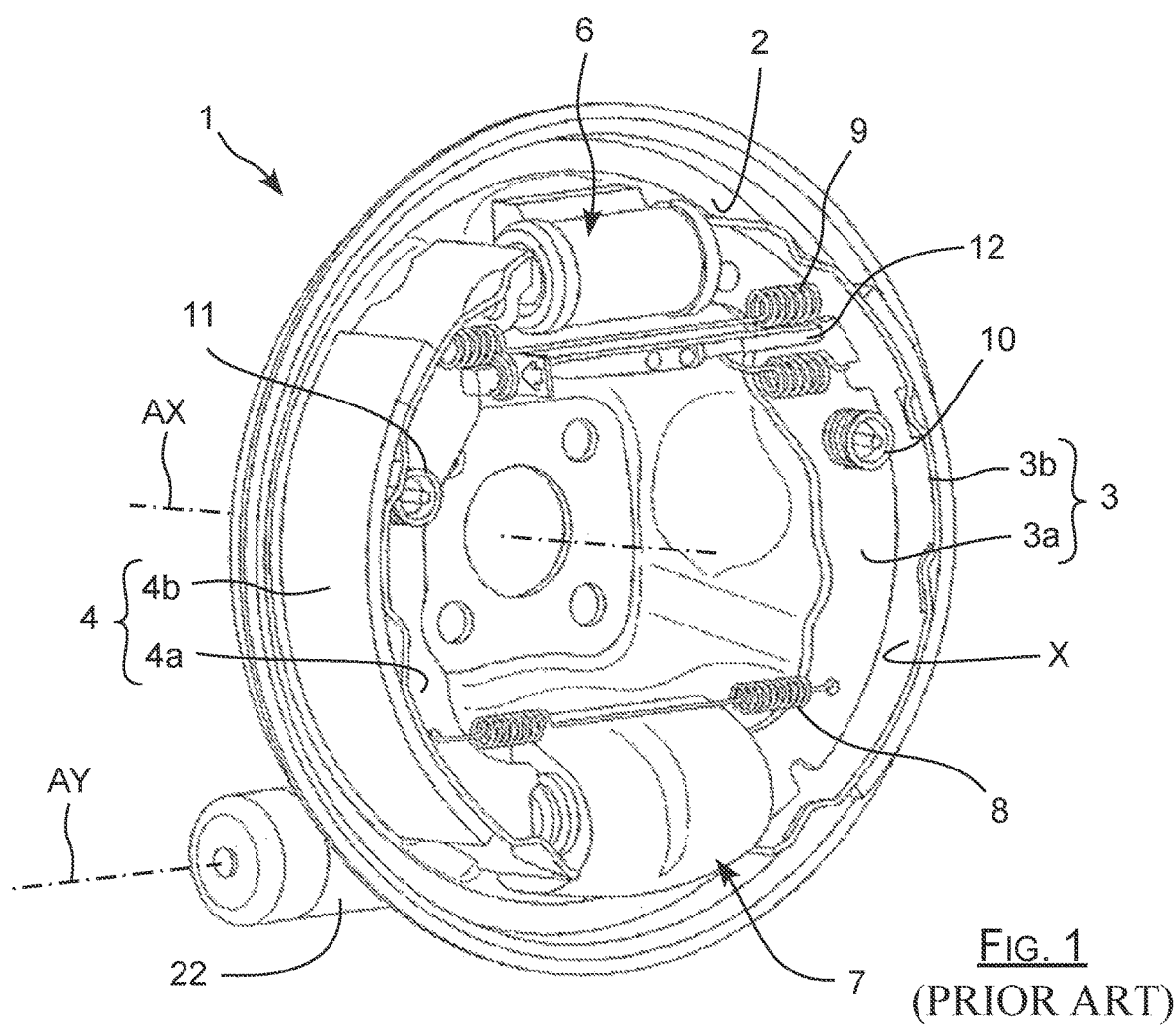
FIG. 1 is a perspective view of a drum brake with electric parking brake actuator according to the state of the art.
Figure 2A:
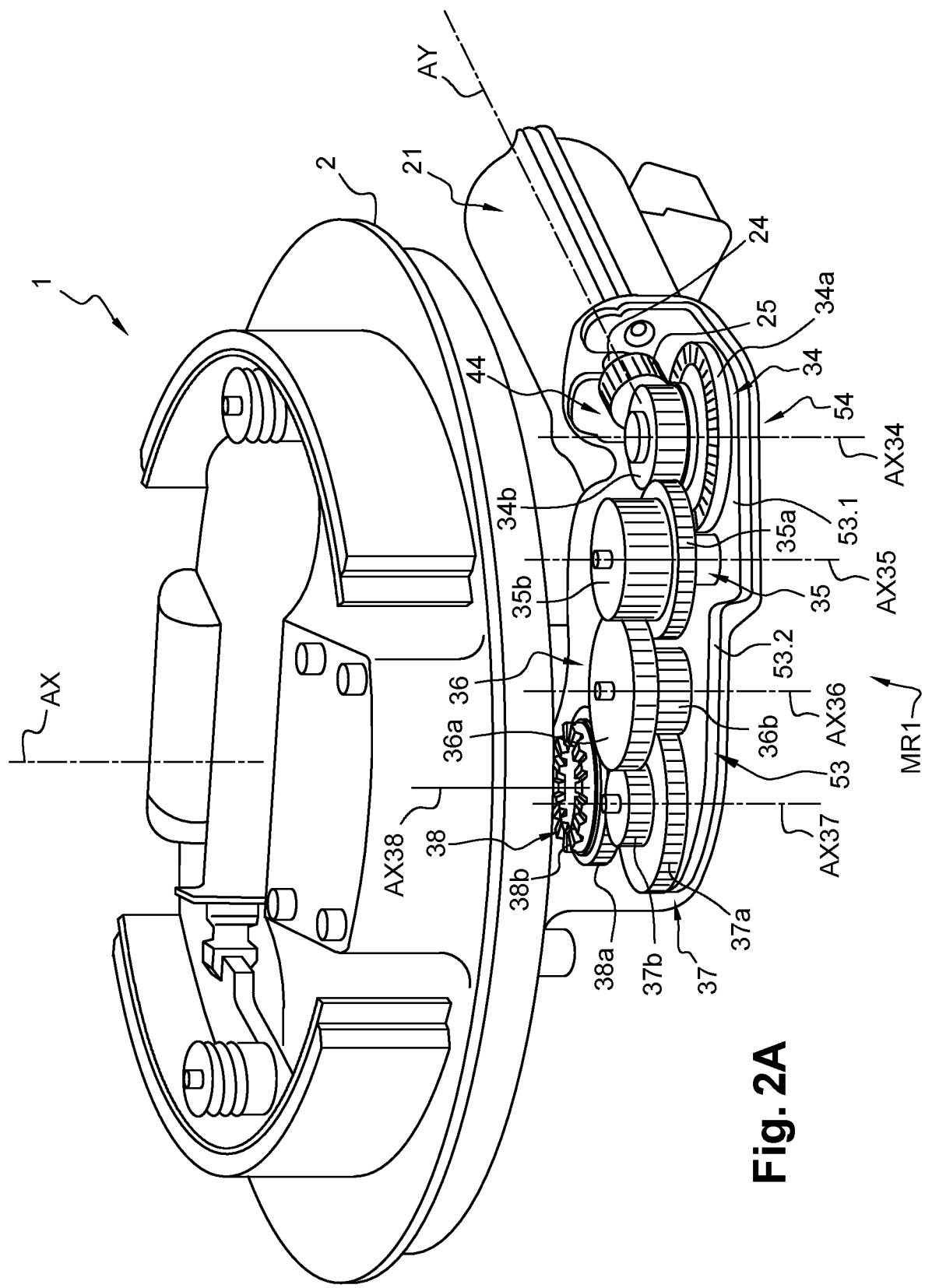
FIG. 2A is a perspective view of a drum brake fitted with a geared motor according to one exemplary embodiment of the present invention, the drum and the cover of the geared motor housing not being represented.
Figure 2B:
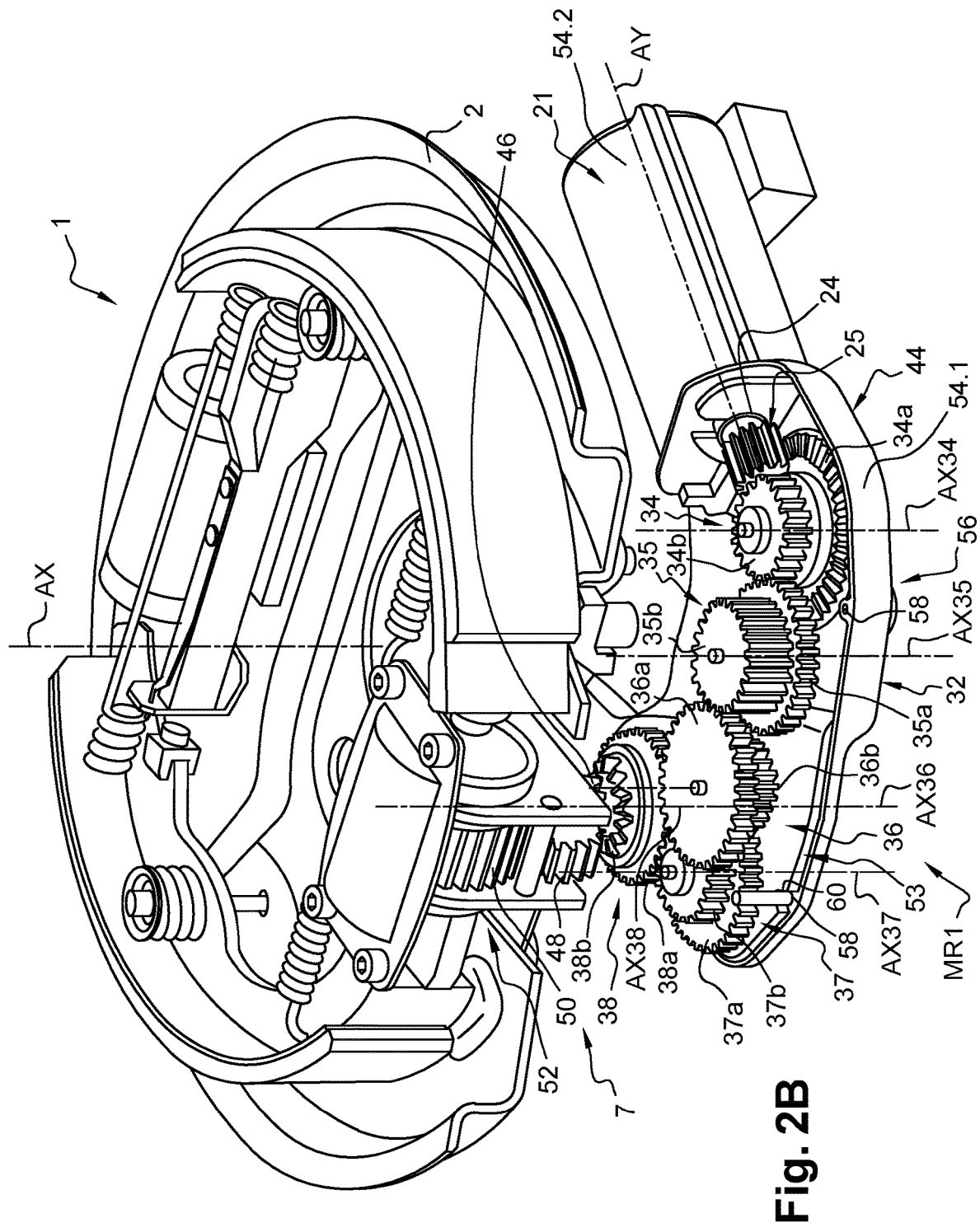
FIG. 2B is a perspective view of the brake of FIG. 2A in which the mechanical actuator is visible as well as the angle transmission between the reduction gearbox and the mechanical actuator.

In FIGS. 2A and 2B, a perspective view of one advantageous example of a geared motor MR1 according to the invention associated with a drum brake 1 comprising an electric parking brake actuator 7 can be seen.

The geared motor MR1 includes an electric motor 21 and a transmission module or reduction gearbox 32.

In the example represented, the electric motor 21 and its output shaft 24 extend along axis AY and the output axis of the transmission module 32 extends along an axis AZ orthogonal to axes AY and AZ.

In this example, the transmission module is intended to extend in parallel to the backing plate 2.

The kinematic chain of the transmission module is in the form of a so-called compound reduction in which the gear elements are in the form of a linear train of externally contacting stepped gears, preferably four to six in number. In the example of FIGS. 2A and 2B, there are five stepped gears 34, 35, 36, 37 and 38.

The stepped gears 34, 35, 36 and 37 respectively comprise a first step in the form of a toothed wheel 34a, 35a, 36a, 37a and a second step in the form of a pinion 34b, 35b, 36b, 37b rigidly connected to the corresponding toothed wheel with a smaller diameter than the latter. The gear 38 comprises a toothed wheel 38a and a ring gear 38b.

The stepped gears 34, 35, 36, 37 and 38 are each arranged to be rotatably mounted about a distinct fixed axis AX34, AX35, AX36, AX37 and AX38, each of these axes being parallel to each other and arranged in that order along the direction of reduction, i.e. from the motor pinion to the mechanical actuator 7. They are especially dimensioned so that the pinion forming the output of one gear meshes with the toothed wheel of the next gear, with the toothed wheel 34a forming the input element of the kinematic chain, while the pinion 38b forms the output element of this chain. The physical axes AX34, AX35, AX36, AX37 and AX38 are depicted by the geometric axes.

The implementation of a reduction gearbox in the form of a stepped gear train offers great freedom in the form that the reduction gearbox can take. Indeed, the relative arrangement of the axes of the stepped gears is free, with only the distances between the axes being set to ensure tangential meshing of a pinion and a toothed wheel. As a result, the gear train can have a more or less extended shape and can thus be best adapted to the available environment around the wheel. In the example represented, the axes of the gears are arranged substantially along an arc of a circle, and this arc of a circle can have a larger or smaller radius of curvature. Indeed, the gear train can be more or less unwound while maintaining the reduction ratio. In other exemplary embodiments, the gear axes are arranged along an S-curve or along a straight line.

Furthermore, the implementation of stepped gears enables the length of the reduction chain to be reduced and thus the overhang of the motor to be reduced, which could be detrimental to the operation of the geared motor and thus the brake in the long term.

Nevertheless, a transmission module comprising pinions and single toothed wheels meshing with stepped gears does not depart from the scope of the invention.

Furthermore, one or more idler wheels can be added into the reduction chain without changing the reduction ratio, for example to lengthen the reduction chain in order to further offset the motor.

Very advantageously and as is represented in FIGS. 2A and 2B, some or all of the stepped gears are alternating. In FIG. 2A, the pinions 35b and 37b are on the same side as the toothed wheel 36a. This allows the reduction gearbox to be relatively flat and thin, so that it can be more easily integrated along the drum. The geared motor has a thickness of, for example, between 1 cm and 8 cm, preferably between 1.5 cm and 5 cm, more preferably between 2 cm and 3 cm, for example a thickness of 2.5 cm.

Figure 5:
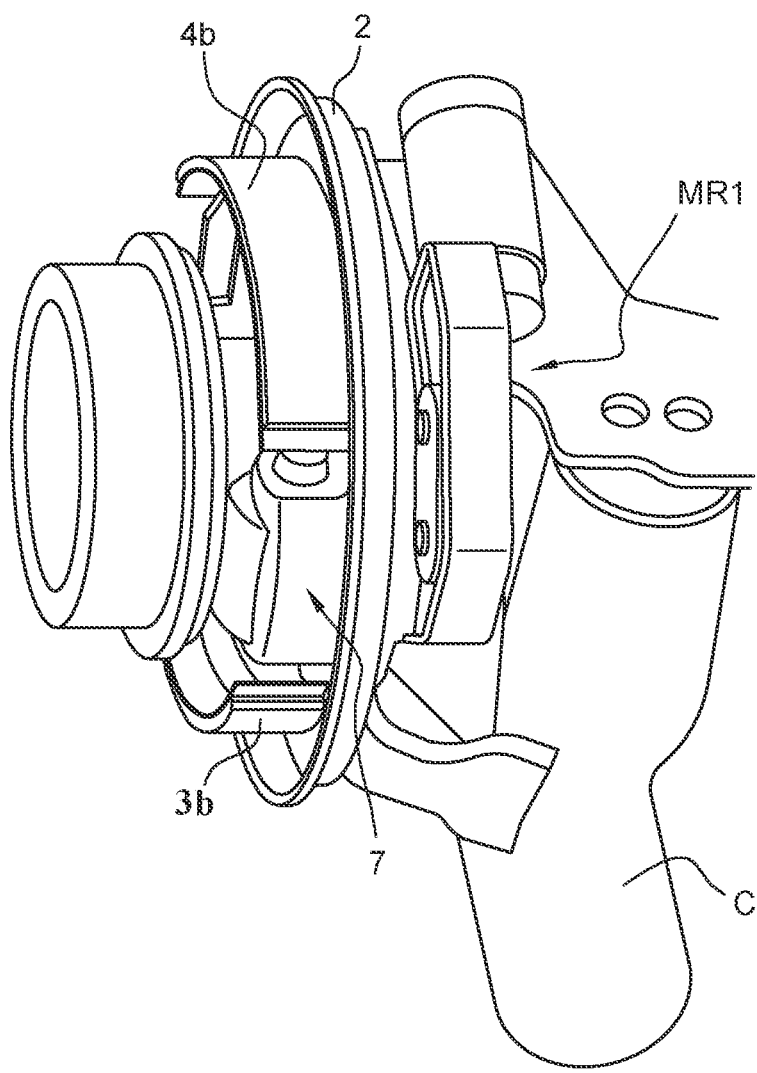
FIG. 5 is a perspective view of the mounting of a geared motor and drum brake on a vehicle chassis, with the drum omitted.

In FIG. 5, the geared motor housed between the backing plate 2 of the drum brake to which it is attached and the chassis C of the automobile vehicle can be seen. It is noticed that the flat and elongate shape of the geared motor allows it to be housed in a narrow space and furthermore allows the motor to be arranged in a wider zone for receiving the motor. The reduction gearbox according to the invention advantageously allows an offset of the motor with respect to the mechanical actuator of the drum brake. As described above, this offset can be adjusted, for example, by lengthening the reduction chain by inserting one or more idler wheels into the reduction chain.

Figure 6:
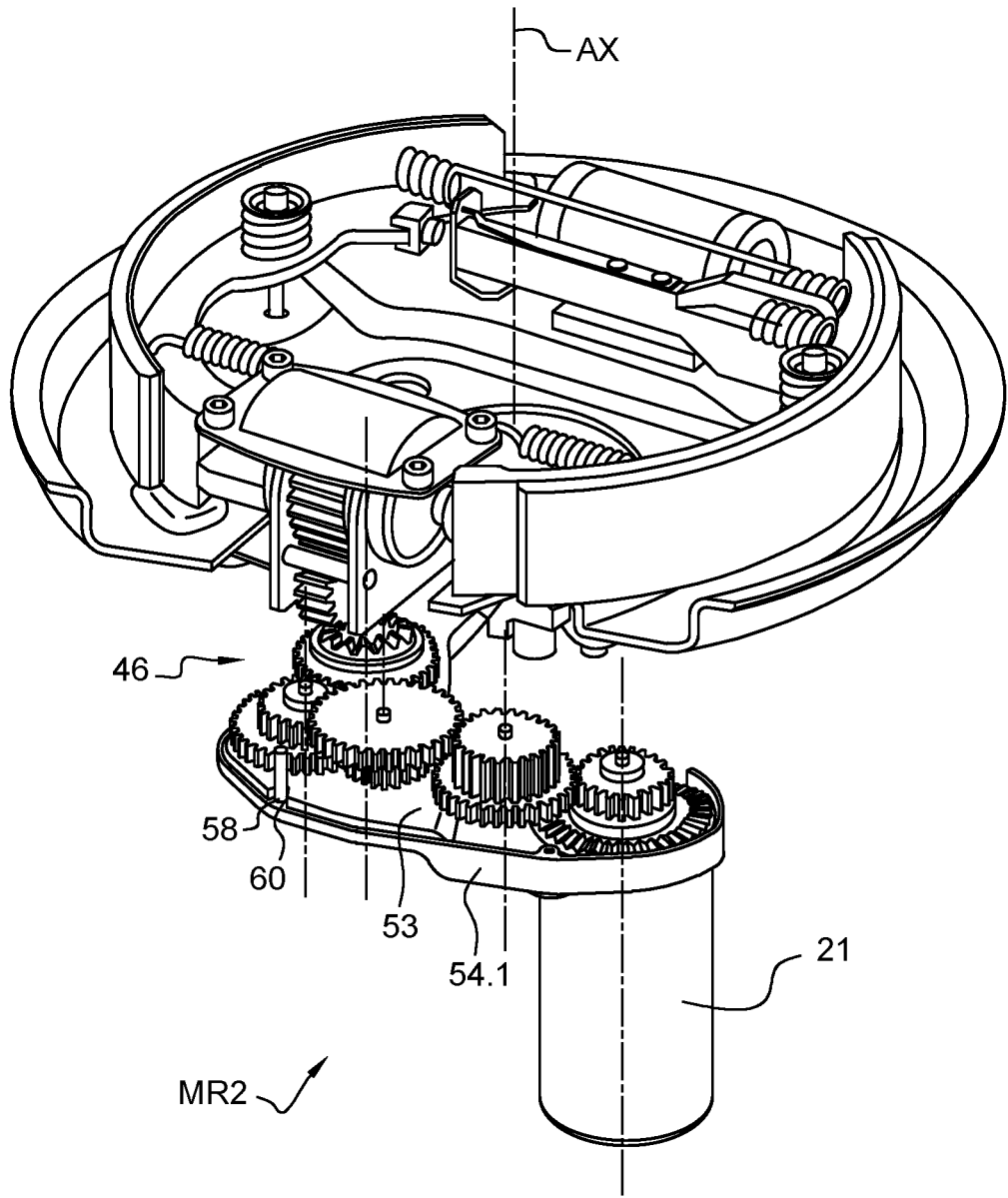
FIG. 6 is a perspective view of a drum brake fitted with a geared motor according to another exemplary embodiment of the present invention, with the drum and the geared motor housing cover not represented.

Very advantageously, the axes AX34 to AX38 about which the stepped gears rotate are integral with a single plate 53 visible in FIG. 6, which is mounted in the bottom of a housing 54 housing the gear train. The axes are perpendicular to the plate. For example, they are made in one piece with the plate 53 by moulding, or they are made of a metal material and are overmoulded in a plastic material plate or they are assembled to it. Preferably, the plate 53 is made of sheet metal, advantageously steel.

In one exemplary embodiment, the axes are integral with the housing, in which case no plate is implemented.

In the example represented, the plate comprises two portions 53.1 and 53.2 extending in two parallel planes. Axes AX34 and AX35 are attached to portion 53.1 and axes AX36, AX37 and AX38 are attached to portion 53.2. This multi-planar arrangement is made possible by the degree of freedom offered by the meshing of the pinions and toothed wheels in the direction of the stepped gear axes. This possibility of distributing the axes in several parallel planes offers additional freedom to adapt the shape of the reduction gearbox to the environment. Indeed, if the environment requires a housing with one or more recesses, the plate 53 can be shaped to follow these recesses without changing the reduction properties of the stepped gear chain. In one example, the plate includes three portions, two portions in one plane and another portion in a different plane parallel to the plane of the two portions and connecting both portions.

The reduction gearbox according to the invention offers both a large freedom of shape in the plane orthogonal to the axes of the gears and also in the direction of the axes of the stepped gears.

The implementation of a single plate has the advantage that the reduction chain can be made beforehand and can be easily mounted in the housing.

Very advantageously, the housing houses both the motor and the reduction gearbox, which simplifies assembly of the geared motor and sealing procedures. In the example represented, the housing comprises two parts, a first part 54.1 comprising the bottom on which the plate 53 carrying the axes of the stepped gears rests and a second part 54.1 forming the cover. Very advantageously, the bottom 54.1 houses both the motor and the reduction gearbox and the cover 54.2 covers both the motor and the reduction gearbox.

In the example of FIGS. 2A and 2B, the bottom has a recess. The shape of the cover may also be adapted to the environment and/or the contours of the gears.

The first and second parts can be symmetrical with respect to a plane passing through the junction zone between the first and second parts.

The housing is advantageously made by moulding plastic material.

Advantageously, the housing 54 comprises means 56 for attaching the geared motor to the drum brake, more particularly the reduction gearbox to the backing plate in order to limit movements of the geared motor which could damage it and/or generate undesirable noise. For example, the means 56 for attaching the geared motor to the backing plate comprise screw holes 58 passing through the housing 54 in the X direction outside the gears, and in which screws are intended to be mounted which co-operate with corresponding apertures provided in the backing plate.

Advantageously, the screw holes 58 form means for positioning the plate with respect to the bottom 54.2 of the housing. In the example represented, the screw holes comprise tubes which are made of the same material as the bottom 54.2 of the housing and notches 60 are formed in the external edge of the plate 53. The notches receive the tubes of the screw holes.

Alternatively, distinct means for positioning the screw holes are contemplatable.

Very advantageously, and as is represented in FIGS. 2A and 2B, the axis of the electric motor is orthogonal to the axes of the stepped gears, thus extending in continuity with the gear train shape in the plane. The geared motor then has a shape that can follow the peripheral edge of the drum around the axle. In this example, the geared motor MR1 has a first angle transmission 44 connecting the motor 21 and the transmission module 32 and a second angle transmission 46 connecting the output of the transmission module and the actuator 7.

The first angle transmission 44 is advantageously of the crown gear type and comprises a pinion 25 and a crown gear 34a, the pinion 25 meshing with the flat toothed wheel 34a. The pinion 25 is engaged with the output shaft 24 of the electric motor 21.

Figure 3:
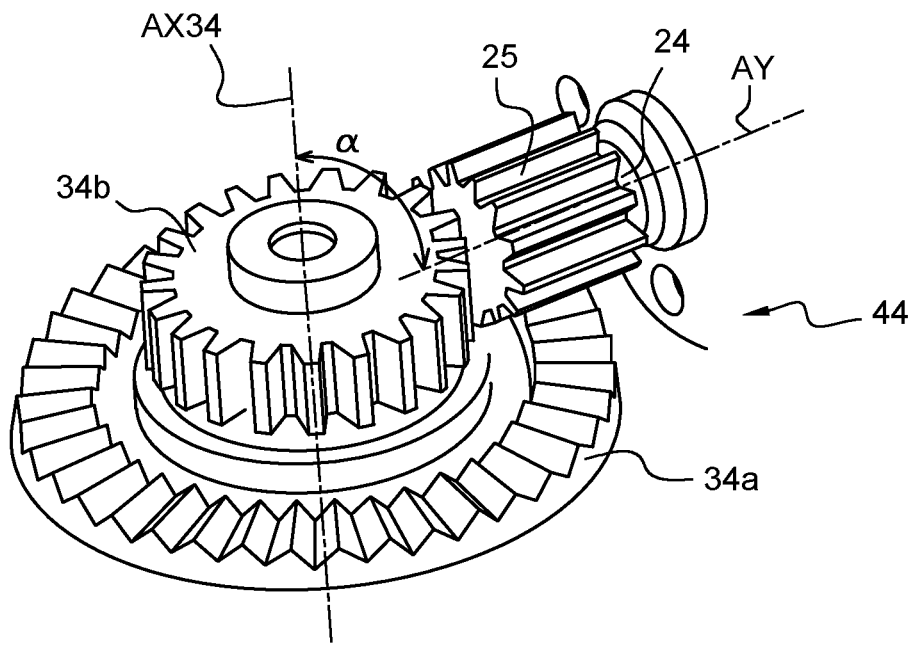
FIG. 3 is a detail view of FIG. 2 at the angle transmission at the motor output.

The crown gear 34a has a wheel with teeth formed in a ring on one side of the wheel. In FIG. 3, the crown gear can be seen represented alone.

The angle transmission with a crown gear offers the advantage of offering freedom in orienting the axis of the pinion 25 with respect to the axis of the crown gear 34a, i.e. a great freedom in selecting the angle of the angle transmission. Indeed, the angle α between the AX34-axis and the axis AY can vary from 30° to 135°. This gives a wide choice of orientations between the motor and the transmission module, to adapt the shape of the geared motor to that of the available space. Further, requirements on mounting accuracy are reduced.

Figure 4:
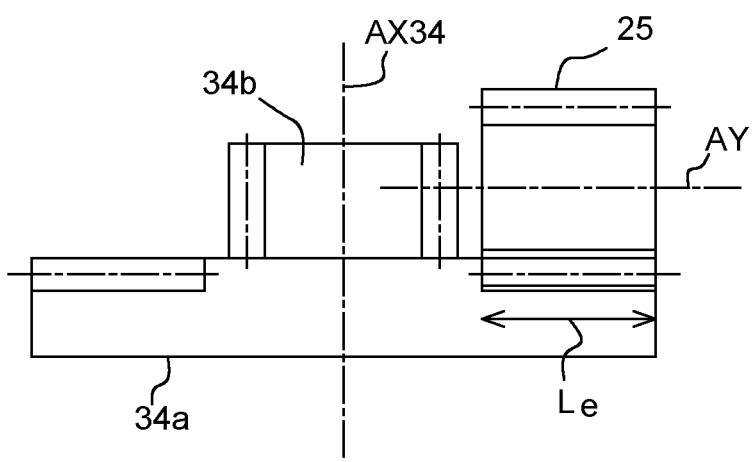
FIG. 4 is a side view of the angle transmission of FIG. 3.

In addition, the position of the teeth of the pinion 25 relative to the teeth of the crown gear 34a can vary. In FIG. 4, the length of meshing Le corresponds to the length of the zone where the teeth of the pinion engage the teeth of the crown gear 34a. The pinion 25 can be arranged with respect to the crown gear with a clearance j. The clearance j is between +/−1/100 mm and +/−10 mm, advantageously between +/−1/10 mm and +/−5 mm, preferably between +/−1 mm and +/−3 mm and even more preferably between +/−2 mm.

This assembly clearance allowed by the crown gear contributes to offering greater freedom in the arrangement of the various elements of the geared motor. The requirements of mounting accuracy are also more relaxed.

In addition, an angle transmission with a crown gear offers an efficiency of 97% to 99%. In comparison, the efficiency of an angle transmission with a bevel gear is about 30% lower than that of an angle transmission with a crown gear.

Advantageously, in the example represented, the second angle transmission also has a crown gear. The toothed wheel 38a, which is driven by the pinion 37b, carries on one of its faces, the upper face in the representation of FIGS. 2A and 2B, the pinion 38b which meshes with a toothed wheel 50 of a transmission gear 52 which transmits the rotation of the geared motor to the actuator 7. The transmission gear 52 includes wheels 48, 50 with parallel axes.

The pinion 38b includes a ring gear. The pinion 38b and the toothed wheel 48 form the crown gear of the second angle transmission of the actuator.

In the example represented, the transmission gear 52 includes the toothed wheel 48 and a toothed wheel 50, which causes pistons bearing on the ends of the brake shoes to be moved apart and moves them apart towards the drum.

According to one alternative, the first and second angle transmissions are conical angle transmissions. According to another alternative, one of the angle transmissions is of a crown gear type and the other is a conical angle transmission.

In FIG. 6, another example of geared motors MR2 according to the invention including an angle transmission 46 at the output only can be seen. In this example, the output shaft of the electric motor drives the toothed wheel 34a directly. The reduction of each meshed toothed wheel/pinion pair is adapted so that the total reduction is as expected. Indeed, in this example one reduction step is removed relative to the example in FIGS. 2A and 2B.

In another example not represented, the toothed wheel at the output directly meshes with the toothed wheel teeth of the actuator. In this case, the axes of the stepped gears are orthogonal to the axes of the stepped gears in FIGS. 2A and 2B.

Thus the geared motor according to the present invention can be easily integrated into wheel spaces of a wide range of shapes and sizes, and thus can be applied to different vehicle models. Adaptation thereof to a given space is relatively easy, as the shape of the geared motor can be modified by changing the relative arrangement of the axes of the stepped gears without changing the characteristics of the reduction gearbox, such as the reduction ratio provided by it. This adaptation does not require time-consuming and costly new developments.

REFERENCES

1: drum brake
2: backing plate
3: first shoe
4: second shoe
3a, 4a: brake webs
3b, 4b: brake linings
6: hydraulic wheel cylinder
7: mechanical actuator
8, 9: return springs
10, 11: lateral springs
12: wear take-up rod
21: electric motor
24: output shaft
25: pinion
32: reduction gearbox
34; 35, 36, 37, 38: stepped gears
34a, 35a, 36a, 37a, 38a: toothed wheels
34b, 35b, 3.6b, 37b, 38b: pinions
44: first angle transmission
46: second angle transmission
48: transmission gear
50, 52: toothed wheels of the transmission gear
53: plate
53.1, 53.2: portions of the plate
54: housing
54.1: first part of the housing
56: means for attaching the geared motor to the plate
58: screw holes
60: notches
AX, AY: axes
AX34, AX35, AX36, AX37, AX38 axes of the gears 34; 35, 36, 37, 38
C: chassis
Le: meshing length
MR1, MR2: geared motor

What is claimed is:

1. A geared motor for a mechanical parking brake actuator of a drum brake including an electric motor comprising an output shaft extending along a first axis, and a reduction gearbox including an output axis extending along a second axis, wherein said reduction gearbox has tangentially meshing stepped gears, each stepped gear comprising a toothed wheel and a pinion which are coaxial integrally rotatably superimposed with each other, said stepped gears being mounted rotatably movable about axes parallel to each other, and wherein the reduction gearbox comprises a plate and wherein the axes about which the stepped gears are freely rotatably mounted, are integral with the plate.

2. The geared motor according to claim 1, wherein the reduction gearbox only includes stepped gears.

3. The geared motor according to claim 1, wherein the stepped gears are at least partially alternating so that the electric motor has a generally substantially flat shape.

4. The geared motor according to claim 1, wherein the plate includes at least two portions arranged in distinct parallel planes.

5. The geared motor according to claim 1, comprising a housing comprising a first part forming a bottom and a second part forming a cover, the plate being arranged in the bottom of the housing.

6. The geared motor according to claim 1, wherein the reduction gearbox comprises four to six stepped gears.

7. The geared motor according to claim 1, wherein the output shaft of the electric motor is orthogonal to the axes about which the stepped gears are rotatable.

8. The geared motor according to claim 7, having an angle transmission comprising a crown gear between the output shaft and the reduction gearbox.

9. The geared motor according to claim 1, wherein the output axis of the reduction gearbox is parallel to the axes about which the stepped gears are freely rotatably mounted.

10. A method for making a geared motor according to claim 1, including:
    manufacturing the plate and the axes integrally with the plate,
    installing the stepped gears around the axes,
    providing a housing including a bottom and a cover,
    installing the plate fitted with the stepped gears in the bottom of the housing,
    installing the cover of the housing.

11. A method for making an electromechanically actuated drum brake including:
    making a drum brake,
    making a geared motor according to the method according to claim 10,
    installing the geared motor so that the stepped gear at the output of the reduction gearbox drives a toothed wheel of the mechanical actuator via an angle transmission,
    attaching the geared motor to the plate of the drum brake.

12. A drum brake comprising a drum, a plate, two shoes, a mechanical actuator attached to the plate and a geared motor for a mechanical parking brake actuator of a drum brake including an electric motor comprising an output shaft extending along a first axis, and a reduction gearbox including an output axis extending along a second axis, wherein said reduction gearbox has tangentially meshing stepped gears, each stepped gear comprising a toothed wheel and a pinion which are coaxial integrally rotatably superimposed with each other, said stepped gears being mounted rotatably movable about axes parallel to each other, wherein the geared motor is mounted to the plate such that, the axes about which the stepped gears are freely rotatably mounted are parallel to the axis of the drum.

* * * * *